United States Patent [19]

Songer

[11] Patent Number: 5,486,874
[45] Date of Patent: Jan. 23, 1996

[54] METHOD AND APPARATUS FOR IMPROVING TRANSMITTED VIDEO SIGNAL STRUCTURE

[75] Inventor: Jimmie D. Songer, Burleson, Tex.

[73] Assignee: Magma, Inc., Fort Worth, Tex.

[21] Appl. No.: 242,170

[22] Filed: May 13, 1994

[51] Int. Cl.⁶ ........................................ H04N 5/14
[52] U.S. Cl. ................. 348/600; 348/677; 348/678
[58] Field of Search ........................ 348/571, 710, 348/711, 695, 691, 613, 607, 606, 678, 677; H04N 5/14

[56] References Cited

U.S. PATENT DOCUMENTS

| | | | |
|---|---|---|---|
| 4,091,414 | 5/1978 | Chow | 348/678 |
| 4,628,362 | 12/1986 | Waehner | 348/678 |
| 5,225,910 | 7/1993 | Sugimori et al. | 348/613 |
| 5,227,883 | 7/1993 | Dischert et al. | 348/606 |
| 5,299,002 | 3/1994 | Fynayama | 348/607 |
| 5,402,179 | 3/1995 | Okada | 348/607 |

*Primary Examiner*—James J. Groody
*Assistant Examiner*—Jeffrey S. Murrell
*Attorney, Agent, or Firm*—David Newman & Associates

[57] ABSTRACT

A video processor, having an input and an output, for compensating for accumulated phase and amplitude errors encountered during transmission of a video signal over a communications channel. The video processor includes a high-pass filter and amplifier, coupled to the input; a post-correction-phase-and-gain restorer; a wide-band-video-delay line coupled to the input; a pre-correction-gain restorer; and a combining network, coupled to the output. The high-pass filter has a bandwidth characteristic which is approximately inverse to a low-pass characteristic encountered by the video signal during its transmission over the communications channel. The high-pass filter takes the video signal and outputs a filtered-video signal. The amplifier associated with the high-pass filter inverts the filtered-video signal. The post-correction-phase-and-gain restorer adjusts the inverted-filtered-video signal to generate a restored-video signal. The wide-band-video-delay line takes the video signal and delays the video signal by a half cycle at the subcarrier frequency to generate a delayed-video signal. The pre-correction-gain restorer buffers the delayed-video signal. The combining network combines the restored-video signal and the delayed-video signal. The output of the combining network is a composite-video signal.

21 Claims, 4 Drawing Sheets

METHOD AND APPARATUS FOR IMPROVING TRANSMITTED VIDEO SIGNAL STRUCTURE

BACKGROUND OF THE INVENTION

This invention relates to natural color television, more particularly to a process and apparatus for improving the structure of the video signal.

Description of the Relevant Art

The National Television System Committee (NTSC) commercial broadcast system is a standard used in the United States, and other countries. The NTSC standard employs a reduced chrominance bandwidth and a wide luminance bandwidth for overall bandwidth conservation. In the NTSC system, the monochrome image is the basic structural element of the color image. For a color image, coarser image elements convert the monochrome image into a color image. The high-frequency luminance information is applied equally to each color channel.

The color information, R—Y or B—Y, occupies approximately 1 MHz ±0.5 MHz of bandwidth, while the luminance bandwidth, Y channel, is maintained at approximately 4 MHz bandwidth. Thus the chrominance signal, R—Y and B—Y channels, when compared to the luminance signal, Y channel, cannot carry the same number of pixels as the Y channel.

Signal distortion and the resulting degradation of the video image is the result of changes in the waveform occurring in a transduction of transmission medium. The principal sources of signal distortion are the relation between input and output at a given frequency, non-uniform transmission at different frequencies, and phrase shift related to frequency. These sources may be particularly severe in transmission lines, such as cable, and transmitter radio frequency (RF) and receiver RF stages. These sources also can occur in video recording equipment.

Signal degradation occurs to a video signal when a multiple-bandwidth modulated carrier having R—Y, B—Y, and Y channels, utilizing different bandwidths for each component, meets capacitative, resistive, or inductive reactance. The capacitive, resistive or inductive reactance affects the different components in the carrier-signal, causing differential phase between the three signals and differential gain. The corruption of the various components of the signal varies inasmuch as the components vary within the signal itself.

Further distortion accumulates in editing, production, and post production. Errors also develop in recording and playback.

Many solutions have been advanced for enhancing the video image by correcting these problems within the normal circuitry of a color-television receiver, either direct-view or projection. In most cases the solutions are applied to the signal as it enters the receiver without regard to the corruption the signal has encountered in the transmission and receiving processes.

Among the many solutions offered in the prior art are reestablishing a predetermined phase-relationship of a chrominance signal with a reference, generating a variety of correction signals which are then added to the video signal, delaying two lines of a signal and adding the interpolation of the chrominance signal back into the first signal, and improving the response by adding a high-frequency component of the luminance signal determined by proportions of various transitions of the chrominance signal. These solutions, however, typically encounter motion matrix problems.

SUMMARY OF THE INVENTION

A general object of the present invention is a video processor of a composite nature which manipulates a signal whereby synchronization, chrominance, and luminance are combined, gathering pre-delayed IQ information plus Y information.

Another object of the invention is restoring the overall composite information, generating signal correction which restores phase and amplitude reference of the composite signal to approximately that of the original signal prior to transmission without changing the bandwidth or the system standards, while avoiding the motion problems of the prior art solutions.

According to the present invention, as embodied and broadly described herein, a video processor is provided for compensating accumulated phase and amplitude errors encountered during transmission of the video signal over a communications channel. The video processor includes a high-pass filter and amplifier, a post-correction-phase-and-gain restorer, a wide-band-video-delay line, a pre-correction-gain restorer, and a combining network. The high-pass filter has a bandwidth characteristic which is approximately inverse to a low-pass characteristic encountered by the video signal during its transmission over the communications channel, or during recording and playback on a recording device. The amplifier associated with the high-pass filter inverts the high-pass-filtered video signal. The post-correction-phase-and-gain restorer adjusts the inverted-filtered-video signal to output a restored-video signal.

The wide-band-video-delay line delays the video signal by a half cycle at the subcarrier frequency, or color frequency, to generate a delayed-video signal. The subcarrier signal is a well known part of the video signal. The subcarrier frequency is the frequency of the subcarrier portion of the video signal. The pre-correction-gain restorer buffers the delayed-video signal. The combining network combines the restored-video signal and the delayed-video signal. The output of the combining network is a composite-video signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
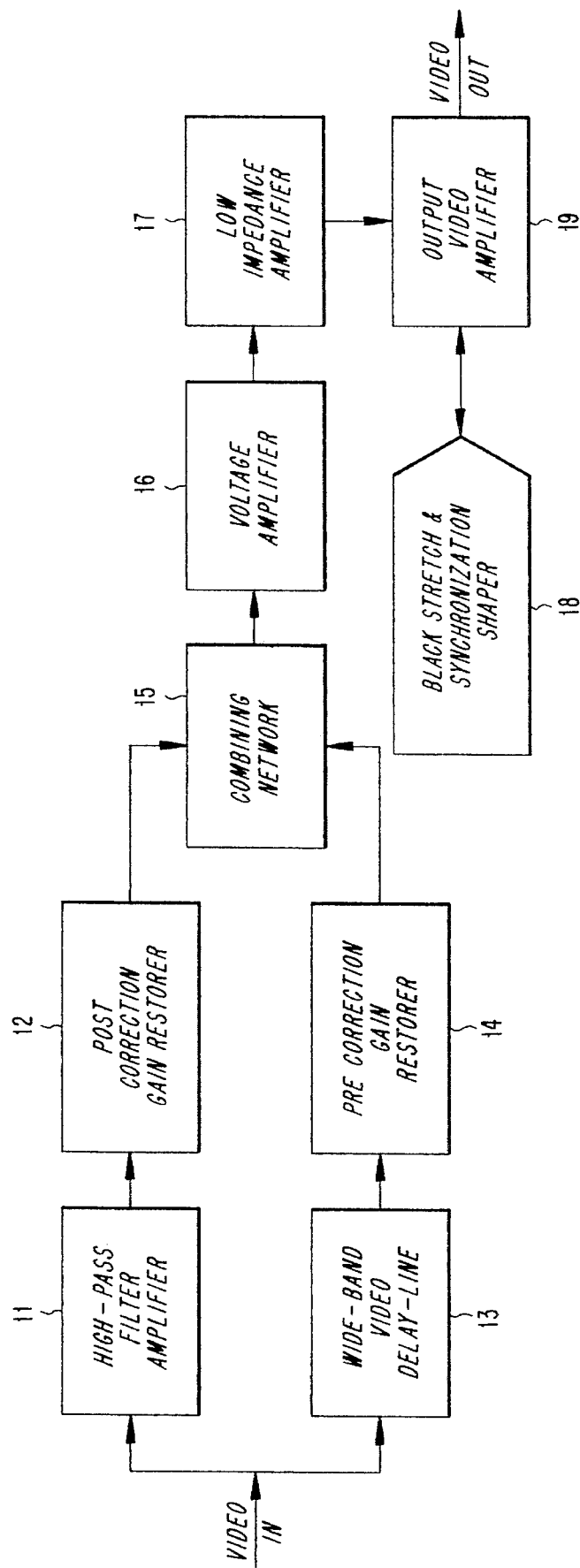
FIG. 1 shows a block diagram of the video signal processor of the present invention.

Reference now is made in detail to the present preferred embodiments of the invention, examples of which are illustrated in the accompanying drawings, wherein like reference numerals indicate like elements throughout the several views.

The present invention broadly provides a novel method for improving the viewing of a television signal at a receiver. A video processor may be embodied in discrete electronic components, as an integrated circuit, as a digital signal processor, as an application-specific integrated circuit, or other equivalent circuit for performing the same means and functions as described herein. Using the teachings of the present invention, equivalent circuits and embodiments would be known to those skilled in the art.

The video processor has an input and an output, with a video signal being applied to the input, and a composite-video signal coming from the output. The video signal applied at the input of the video processor, is the video signal to be compensated for accumulated phase and amplitude errors encountered during transmission over a communication channel, during recording and playback of a video recorder, or during equivalent sources of errors. The phase and amplitude errors may be due to bandwidth effects as the video signal, modulating a radio frequency (RF) carrier signal, passes through a cable or transmission line, RF circuitry of a transmitter, or circuitry in the front-end of a receiver. Typically, a cable, a transmission line, or a front-end of a receiver has a low-pass frequency characteristic which tends to limit the amount of the video signal being passed therethrough.

The video processor broadly includes high-pass-filter-and-amplifier means, post-restorer means, delay means, and combiner means. The high-pass-filter-and-amplifier means is coupled between the input of the video processor, and post-restorer means. The delay means is coupled to input of the video processor. The post-restorer means and the delay means are coupled to combiner means.

The high-pass-filter-and-amplifier means is for filtering a video signal. The high-pass-filter-and-amplifier means has a bandwidth characteristic which preferably is inverse to the low-pass characteristic encountered during transmission of the video signal over the communications channel, or during recording and playback of the video signal in a video recorder. As used herein, the low-pass characteristic includes those effects encountered through the transmission medium, such as cable, transmission lines, and other types of channels, and the input circuit of the receiver, or equivalent effects in a video recorder. Ideally, the high-pass-filter-and-amplifier means has an amplitude versus frequency response which is a reverse curve of the effects encountered by the video signal. The high-pass-filter-and-amplifier means pre-equalizes the video signal in a linear mode.

The high-pass-filter-and-amplifier means inverts the filtered-video signal. The high-pass-filter-and-amplifier means typically phase shifts by 180° the filtered-video signal. The output of the high-pass-filter-and-amplifier means is denoted herein as an inverted-filtered-video signal.

The post-restorer means restores the inverted-filtered-video signal to a restored signal level. The output signal from the post-restorer means is denoted herein as a restored-video signal.

The delay means delays the video signal from the input, by an odd integer multiple of a half cycle at the subcarrier frequency. Preferably, the delay means delays the video signal by only a half cycle at the subcarrier frequency. The output of the delay means is denoted herein as a delayed-video signal.

The combiner means combines the restored-video signal and the delayed-video signal to generate a composite-video signal. The composite-video signal includes the effects of the restored-video signal and the delayed-video signal.

The post-restorer means may include means for adjusting the inverted-filtered-video signal to a restored-signal level. Also, the present invention may further include pre-correction means for adjusting the delayed-video signal to the restored-signal level. The pre-correction means is coupled between the delay means and the high-pass-filter-and-amplifier means. By having the inverted-filtered-video signal and the delayed-video signal amplified to the restored signal level, compensation is more easily effected at the combiner means.

In the exemplary arrangement shown in FIG. 1, the high-pass-filter-and-amplifier means is embodied as a high-pass filter and amplifier 11, the post-restorer means is embodied as a post-correction-phase-and-gain restorer 12, the delay means is embodied as a wide-band-video delay line 13, the pre-correction means is embodied as a pre-correction-gain restorer 14, and the combiner means is embodied as a combining network 15. The high-pass filter and amplifier 11 are coupled between the video input and the post-correction-phase-and-gain restorer 12. The wide-band-video delay line 13 is coupled between the video input and the pre-correction-gain restorer 14. The combining network 15 is coupled to the post-correction-phase-and-gain restorer 12 and to the pre-correction-gain restorer 14.

The circuitry of the present invention may further include a voltage amplifier 16 coupled to the output of the combining network 15, and low-impedance amplifier 17 coupled to the output of the voltage amplifier 16. Additionally, a black-stretch and synchronization shaper 18 may be coupled for controlling an output-video amplifier 19. The output-video amplifier 19 is coupled to the low-impedance amplifier 17 and to the video output.

The combining network 15 outputs a composite-video signal. The voltage amplifier 16 amplifies the composite-video signal, and the low-impedance amplifier 17 matches an impedance output of the voltage amplifier 16 to the output-video amplifier 19. The output-video amplifier 19 outputs the composite-video signal.

Figure 2:
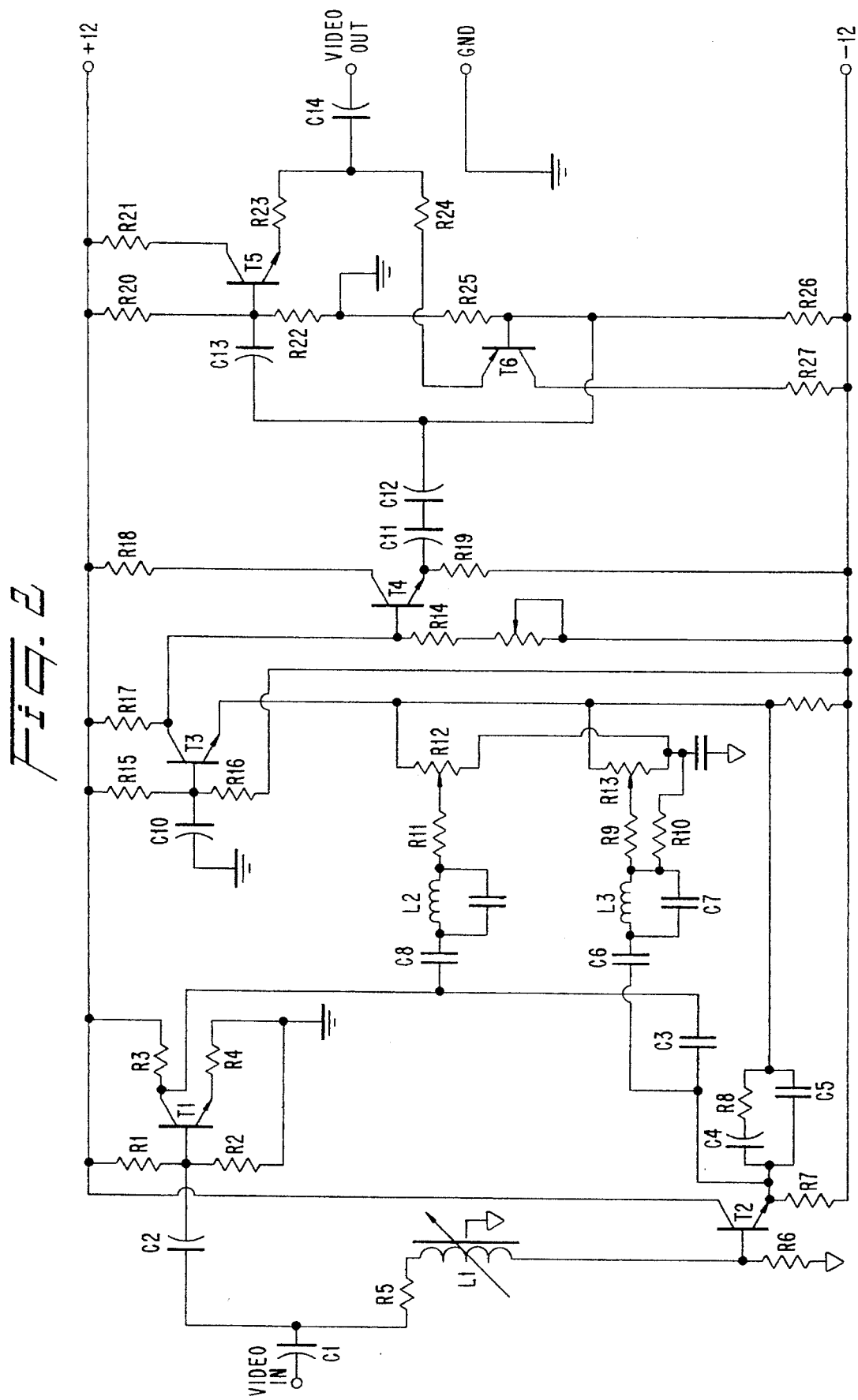
FIG. 2 is a circuit diagram of the video signal processor of FIG. 1.

The high-pass filter and amplifier 11 has a bandwidth characteristic inverse to a low-pass characteristic encountered during transmission over the communications channel or during recording and playback in a recording device. Referring to FIG. 2, the high-pass filter and amplifier 11 may be embodied as capacitor C2 and transistor T1. For an NTSC signal, the capacitor C2 might be a fifty picofared capacitor. The high-pass filter and amplifier 11 typically has a reactance which deceases 6 dB per octave. The transistor T1 inverts the high-pass-filtered video signal from the capacitor C2.

As shown in FIG. 2, a class A amplifier working in a linear part of a characteristic curve may serve as part of the high-pass filter and amplifier 11. The high-pass filter and amplifier 11 includes transistor T1, with biasing resistors R1 and R2. Additionally, collector resistor R3 and emitter resistor R4 serve to bias the transistor T1 into the linear part of its characteristic curve.

The post-correction-phase-and-gain restorer 12 restores a signal level of the inverted-filtered-video signal. The output of the post-correction-phase-and-gain restorer 12 is the restored-video signal. The post-correction-phase-and-gain restorer 12 may be embodied as a resistor R12, which can adjust the signal level of the inverted-filtered-video signal.

The wide-band-video delay line 13 delays the video signal by an odd integer multiple of a half cycle at the subcarrier frequency. Preferably, the wide-band-subcarrier delay line 13 delays the video signal by a half cycle at the subcarrier frequency. As shown in FIG. 2, the wide-band-video delay line 13 is embodied as delay line L1 coupled through resistor R5 and coupling capacitor C1 to the input.

A buffer circuit may buffer the delayed-video signal from the output of the wide-band-video-delay line 13. As shown in FIG. 2, the buffer may be embodied as a transistor T2 coupled to base resistor R6, and emitter resistor R7. Transistor T2 is shown as an emitter-follower circuit, having a gain of approximately one.

The pre-correction-gain restorer 14 restores a signal level of the delayed-video signal to the restored-video signal. In FIG. 2, the pre-correction-gain restorer 14 is embodied as resistor R13, which adjusts the signal level of the delayed-video signal.

The combining network 15 combines the restored-video signal and the delayed-video signal. The output of the combining network 15 is the composite-video signal. The combining network 15 is shown in FIG. 2 as resistor R11, R12, R9, R13, coupled to the emitter of transistor T3. Coupling capacitor C8 couples the post-correction-phase-and-gain restorer to the output of transistor T1, and the capacitor C6 couples the pre-correction-gain restorer to transistor T2. Inductor L2 and capacitor C9 filter the restored-video signal. Inductor L3 and capacitor C7 filter the delayed-video signal.

The voltage amplifier 16 is shown as transistor T3. Transistor T3 has biasing resistors R15, R16, and collector resistor R17.

The low-impedance amplifier 17 is shown as transistor T4 with its base connected to the collector of transistor T3. Transistor T4 is an emitter-follower circuit, and serves as a low-impedance amplifier.

Figure 3:
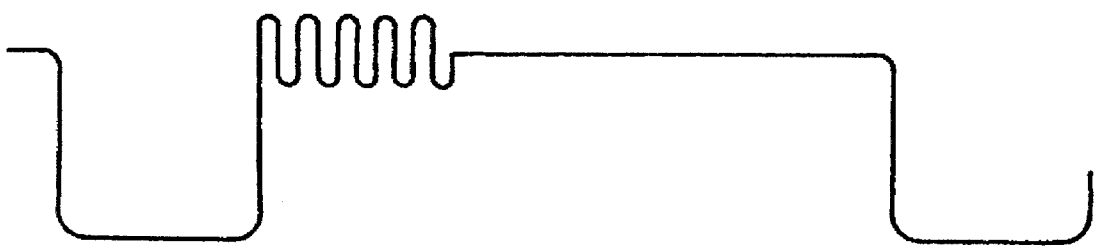
FIG. 3 is a drawing of the corrupted waveform.

As illustratively shown in FIG. 1, a composite NTSC video signal is received by the video processor from any source and the signal passes to a high-pass filter and amplifier 11, while simultaneously being diverted to a wide-band video delay line 13. A corrupted video signal is shown in FIG. 3.

The high-pass filter and amplifier 11 filters the video frequency with a bandwidth characteristic inverse to a low-pass characteristic encountered by the video signal during its transmission or recording playback. The filtered-video signal also is amplified and inverted. Post-correction-phase-and-gain restorer 12 restores a signal level to the inverted-filtered video signal. The output of the post-correction-phase-and-gain restorer 12 is the restored-video signal.

The high-pass filter and amplifier 11 samples the high-frequency components of the composite signal and inverts the high-frequency components 180° out of phase, while amplifying them. Simultaneously, the identical composite signal is passed through a variable, wide-band video delay line 13 adjusted to the additive, inverted, amplifier-signal output, delaying the entire composite video signal. The video signal is delayed by a half cycle.

Both signals are then fed, respectively, to a post-correction-phase-and-gain restorer 12 and to a pre-correction gain restorer 14, both of which are adjusted to correct the leading and lagging edges of the high-frequency components. Using a portion of the shape of the standard synchronization tip of the original video signal as a reference, post-correction-phase-and-gain restorer 12 and pre-correction gain restorer 14 drive the combining network 15 to adjust the signal from the high-pass filter and amplifier 11 for composite symmetry, and adjust the signal from the wide-band-video-delay line 13 to correct the tilt of the low-frequency components. Thus, the non-delayed signal pre-phases the delayed signal, forming a corrected composite signal.

The information in the delay line is precisely adjusted to delay the composite information by one-half cycle of 3.579545 MHz for NTSC systems, so that when the wide-band, inverted, amplified information is added back to the composite delayed information, the information in the wide-band, inverted, amplified signal is in phase, i.e., additive, with the 3.579545 MHz components of the composite delayed information.

Figure 4:
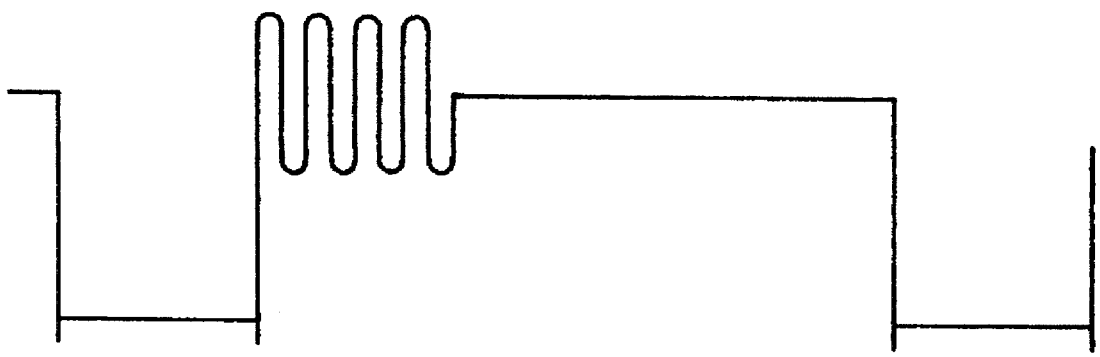
FIG. 4 is a drawing of the corrected waveform.
Figure 5:
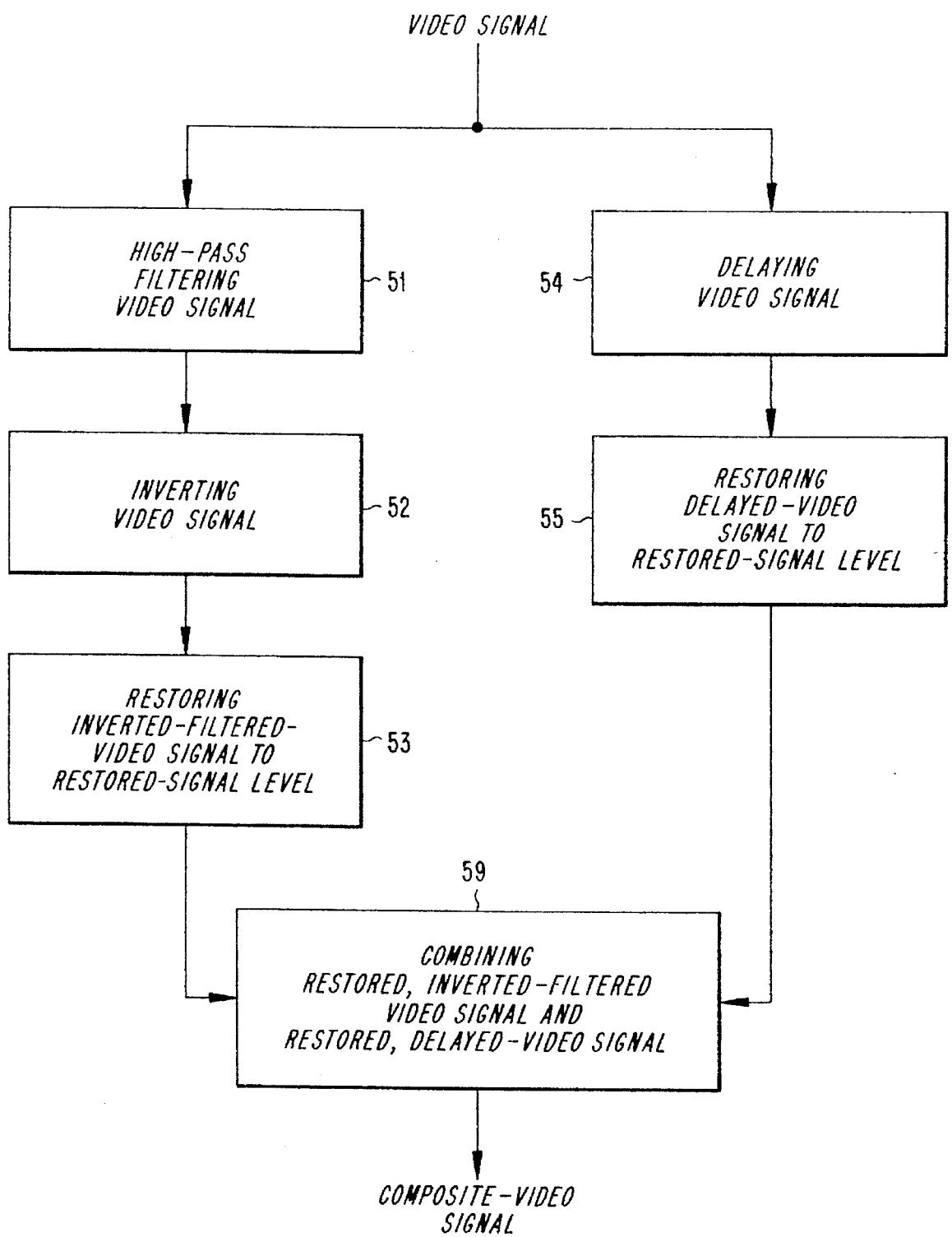
FIG. 5 is a flowchart of the method of the present invention.

The combining network 15 combines the restored-video signal from the post-correction-phase-and-gain restorer 12 and the delayed-video signal from the pre-correction-gain restorer 14, to generate the composite-video signal. The composite-video signal has a corrected waveform as shown in FIG. 4.

The corrected composite-video signal is then passed through a voltage amplifier 16 to restore the video amplitude of the composite video information, then passed through a low-impedance amplifier 17 to maintain the integrity of the correction, then to a push-pull, low-impedance video output amplifier 19 which evaluates the signal and interacts with a black-stretch and synchronization shaper 18 which adds back amplitude to the synchronization tip and gamma corrects the video information in the black areas for restored video output.

The voltage amplifier 16 amplifies the composite-video signal from the combining network 15. The low-impedance amplifier 17 matches impedances of the amplified composite-video signal from the voltage amplifier 16. The output-video amplifier 19 further amplifies the signal from the low-impedance amplifier 17.

The present invention also includes a method using a video processor, for compensating accumulated phase and amplitude errors encountered during transmission of the video signal over the transmission channel. The method includes the steps of high-pass filtering 51 the video signal with a bandwidth characteristic inverse to a low-pass characteristic encountered during transmission of the video signal. The steps further include inverting 52 the filtered-video signal to generate an inverted-filtered-video signal. Also, the video signal is delayed 54 by a half cycle. The delayed-video signal and the inverted-filtered-video signal are combined 59 to generate a composite-video signal.

The method may further include the steps of restoring 53 the inverted-filtered-video signal to a restored-signal level, and restoring 55 the delayed-video signal to the restored-signal level. The restored inverted-filtered-video signal and the restored delayed-video signal, which both have a signal approximately equal to the restored-signal level, are then combined 59 to generate the composite-video signal.

One skilled in the art could apply the same principles to the PAL system and the SECAM system to achieve the same results under these systems. Used solely in a broadcast mode, the system would be pre-emphasized to compensate for the de-emphasis through transmission and detecting mode.

It will be apparent to those skilled in the art that various modifications can be made to the video processor of the instant invention without departing from the scope or spirit of the invention, and it is intended that the present invention cover modifications and variations of the video processor provided they come within the scope of the appended claims and their equivalents.

I claim:

1. A video processor, having an input and an output, for compensating accumulated phase and amplitude errors encountered during transmission over a communications channel, of a video signal coupled to said input, comprising:

a high-pass filter, coupled to said input, having a bandwidth characteristic inverse to a low-pass characteristic encountered during transmission of a video signal over the communications channel;

an inverting amplifier, coupled to said high-pass filter, for inverting a high-pass-filtered video signal;

a post-correction-phase-and-gain restorer, coupled to said high-pass filter and to said inverting amplifier, for restoring a signal level of the high-pass-filtered video signal, as a restored-inverted-video signal;

a wide-band-video-delay line, coupled to said input, for delaying the video signal by an odd integer multiple of a half cycle at a subcarrier frequency as a delayed-video-signal;

a pre-correction-gain restorer, coupled to said wide-band-video-delay line, for restoring the delayed-video signal as a restored-delayed-video signal; and a combining network, coupled to said output, to said post-correction-phase-and-gain restorer, and to said pre-correction-gain restorer, for combining the restored-inverted-video signal and the restored-delayed-video signal, and outputting a composite-video signal at said output.

2. The video processor as set forth in claim 1 with said inverting amplifier including a class A amplifier biased in a linear region of a characteristic curve of said class A amplifier.

3. A video processor, having an input and an output, for compensating for accumulated phase and amplitude errors encountered during transmission over a communications channel of a video signal, comprising:

a high pass filter and inverting amplifier, coupled to said input, for filtering and inverting the video signal as an inverted-filtered-video signal;

a post-correction-phase-and-gain restorer, coupled to said high pass filter and inverting amplifier, for restoring a signal level of the inverted-filtered-video signal as a restored-inverted-filtered-video signal;

a wide-band-video-delay line, coupled to said input, for delaying the video signal as a delayed-video signal;

a pre-correction-gain restorer, coupled to said wide-band-video-delay line, for restoring the delayed-video signal as a restored-delayed-video signal; and a combining network, coupled to said output, to said post-correction-phase-and-gain restorer, and to said pre-correction-gain restorer, for combining the restored-inverted-filtered-video signal and the restored-delayed-video signal, and outputting a composite-video signal to said output.

4. The video processor as set forth in claim 3 with said high-pass filter and inverting amplifier including a class A amplifier biased in a linear region of a characteristic curve of said class A amplifier.

5. The video processor as set forth in claim 3 with said wide-band-video-delay line delaying said video signal by a half cycle at a subcarrier frequency.

6. The video processor as set forth in claim 1 or 3 with said pre-correction-gain restorer including an amplifier having a gain of one for buffering the delayed-video signal.

7. The video processor as set forth in claim 1 or 3 with said combining network including a resistor network for combining the restored-inverted-video signal and the restored-delayed-video signal to generate the composite-video signal.

8. The video processor as set forth in claim 3 with said wide-band-video-delay line delaying the video signal by an odd integer multiple of a half cycle at a subcarrier frequency.

9. A video processor, having an input and an output, for compensating accumulated phase and amplitude errors encountered during transmission over a communications channel, of a video signal, comprising:

high-pass-filter-and-amplifier means, coupled to said input, having a bandwidth characteristic inverse to a low-pass characteristic encountered during transmission of the video signal over the communications channel, for filtering the video signal as a filtered-video signal and for inverting the filtered-video signal as an inverted-filtered-video signal;

post-restorer means for restoring the inverted-filtered-video signal to a restored-signal level, thereby generating a restored-inverted-filtered-video signal;

delay means, coupled to said input, for delaying the video signal as a delayed-video signal; and combining means for combining the restored-inverted-filtered-video signal and the delayed-video signal to generate a composite-video signal at said output.

10. The video processor as set forth in claim 9 with said post-restorer means including means for adjusting the inverted-filtered-video signal to a restored-signal level.

11. The video processor as set forth in claim 9 further including pre-correction means for adjusting the delayed-video signal to a restored-signal level.

12. The video processor as set forth in claim 11, with said post-restorer means including means for variably adjusting the inverted-filtered-video signal to the restored-signal level.

13. The video processor as set forth in claim 9, 10 or 12 with said high-pass-filter-and-amplifier means including a class A amplifier biased in a linear region of a characteristic curve of said class A amplifier.

14. The video processor as set forth in claim 11 or 12 with said pre-correction means including an amplifier having a gain of one for buffering the delayed-video signal.

15. The video processor as set forth in claim 9 or 11 with said combining means including a resistor network for combining the restored-inverted-filtered video signal and the delayed-video signal to generate the composite-video signal.

16. The video processor as set forth in claim 9 with said delay means delaying said video signal by a half cycle at a subcarrier frequency.

17. The video processor as set forth in claim 9 with said delay means delaying the video signal by an odd integer multiple of a half cycle at a subcarrier frequency.

18. A method using a video processor, for compensating accumulated phase and amplitude errors encountered during transmission of a video signal, comprising the steps of:

filtering the video signal with a bandwidth characteristic inverse to a low-pass effect encountered during transmission of the video signal;

inverting the filtered-video signal, thereby generating an inverted-filtered-video signal;

delaying the video signal by an odd integer multiple of a half cycle at a subcarrier frequency thereby generating a delayed-video signal; and combining the inverted-filtered-video signal and the delayed-video signal to generate a composite-video signal.

19. The method as set forth in claim 18 further including the step of adjusting the inverted-filtered-video signal to a restored-signal level.

20. The method as set forth in claim 18 further including the step of adjusting the delayed-video signal to a restored-signal level.

21. The method as set forth in claim 18 further including the steps of:
- adjusting the inverted-filtered-video signal to a restored-signal level; and
- adjusting the delayed-video signal to the restored-signal level.

* * * * *